United States Patent [19]

Levine

[11] 4,033,531

[45] July 5, 1977

[54] MOUNTING ASSEMBLY WITH SELECTIVELY USED ONE-PIECE OR TWO-PIECE BRACKETS

[76] Inventor: Fred Levine, 1330 - 99th St., Bay Harbor Island, Fla. 33154

[22] Filed: Apr. 27, 1976

[21] Appl. No.: 680,797

[52] U.S. Cl. .................................... 248/16; 310/91
[51] Int. Cl.² .................... F16M 11/04; F16M 1/00
[58] Field of Search ................. 248/12, 13, 14, 16, 248/165, 174, 300; 310/91, 89

[56] References Cited

UNITED STATES PATENTS

| | | | |
|---|---|---|---|
| 1,688,897 | 10/1928 | Spreen | 248/16 X |
| 2,706,023 | 4/1955 | Merritt | 248/231 X |
| 3,326,503 | 6/1967 | Bade | 248/14 |
| 3,339,868 | 9/1967 | Ehrens et al. | 248/14 |
| 3,860,206 | 1/1975 | Wenig | 248/13 |

Primary Examiner—J. Franklin Foss
Attorney, Agent, or Firm—Clarence A. O'Brien; Harvey B. Jacobson

[57] ABSTRACT

A kit for mounting electric motors, refrigerant tanks, and the like, on a support surface has a clamp including a strap embracing an article to be mounted. Support brackets, each having an upstanding leg portion and a depending base portion, are provided with suitable apertures and slots in the leg portion for selectively receiving the strap in such a manner as to appropriately and adjustably mount the article on an associated support surface. Each leg portion is constructed in two pieces, a lower section and an upper section adjustably attachable to the lower section, with the sections either being used together or separately to make possible a particular installation.

9 Claims, 9 Drawing Figures

U.S. Patent  July 5, 1977  Sheet 1 of 2  4,033,531
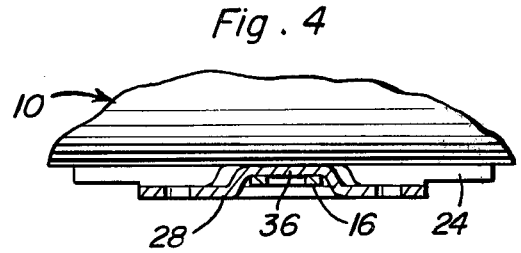
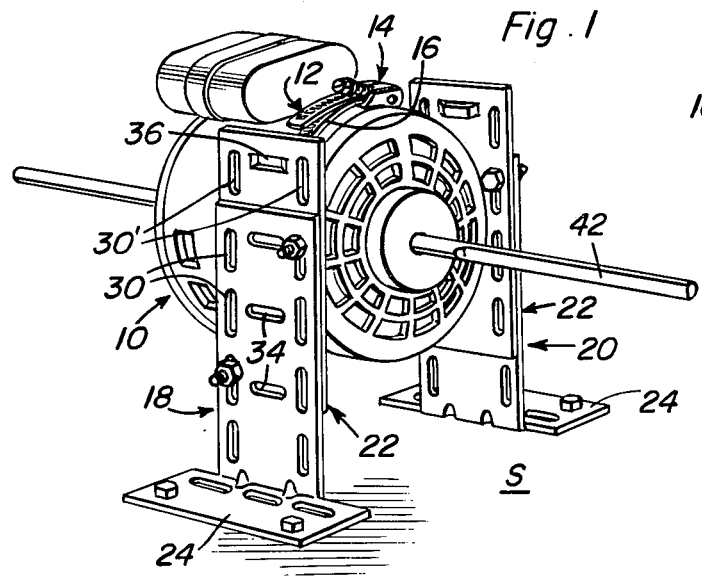
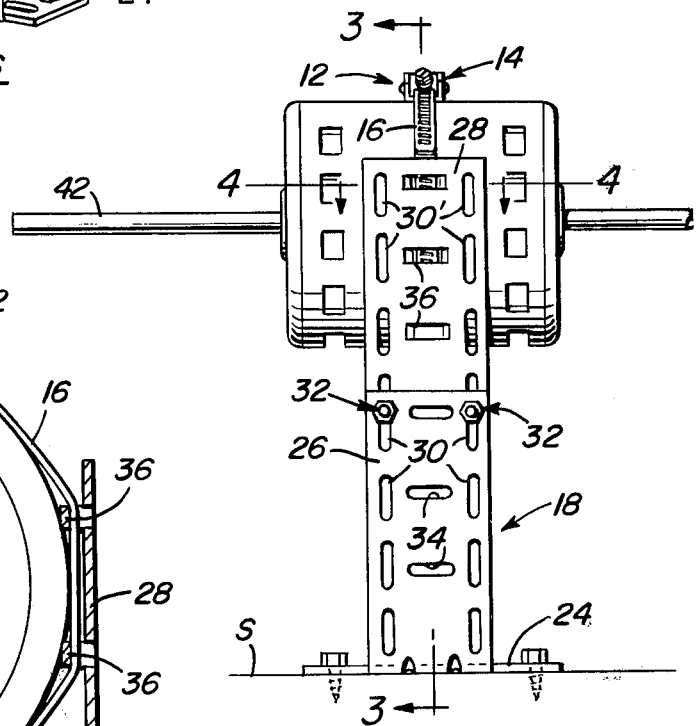
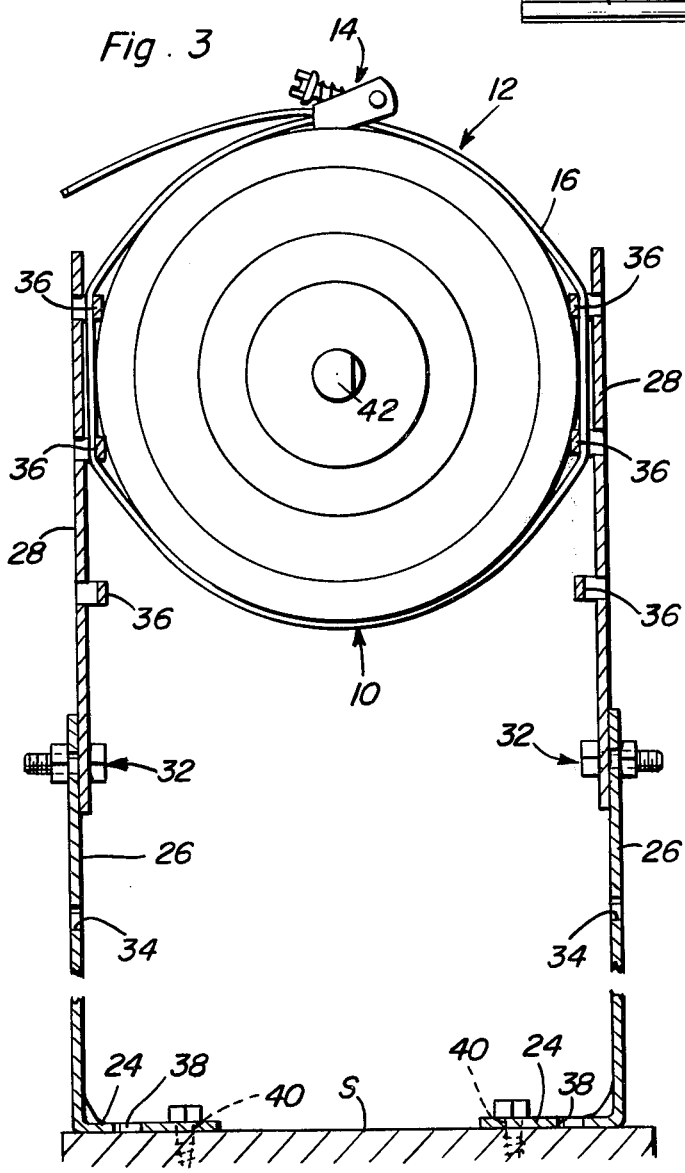
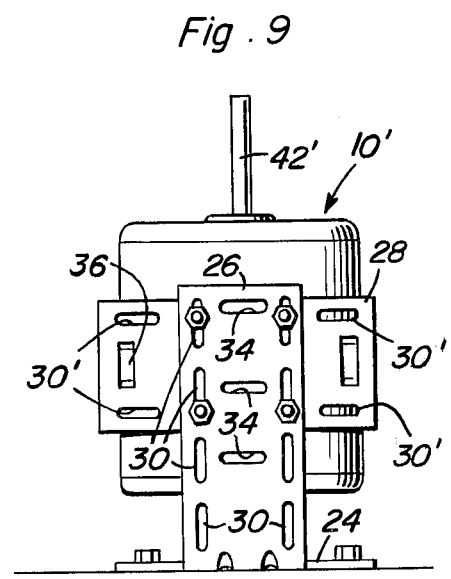

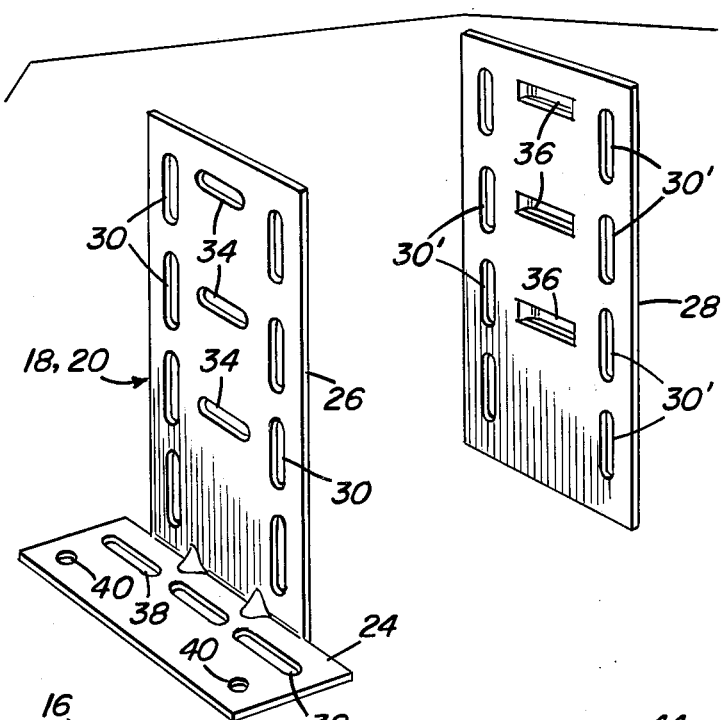
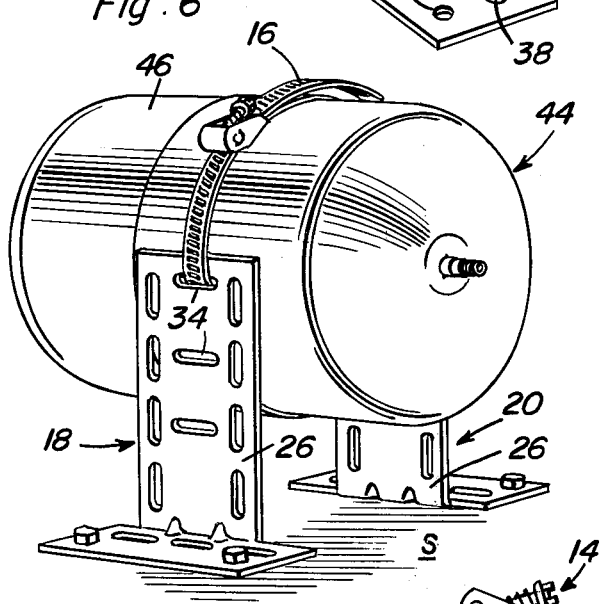
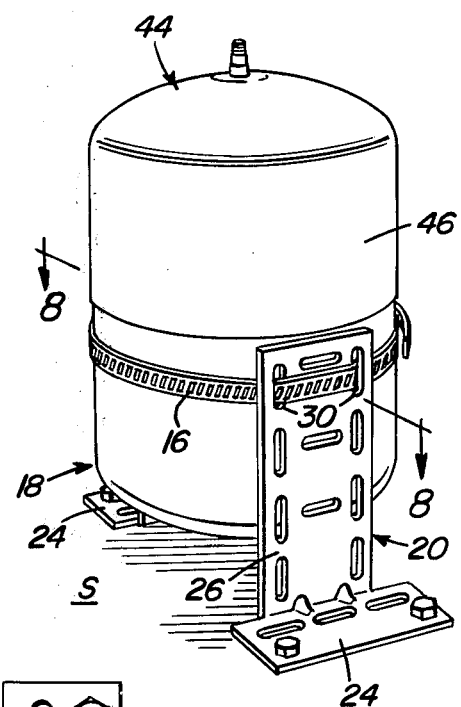
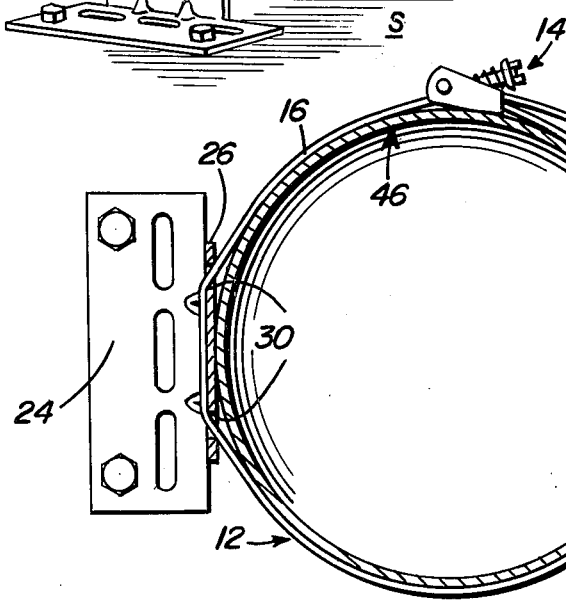

4,033,531

MOUNTING ASSEMBLY WITH SELECTIVELY USED ONE-PIECE OR TWO-PIECE BRACKETS

BACKGROUND OF THE INVENTION

1. Field of the Invention

This invention relates generally to devices for mounting various equipment, such as electric motors, refrigerant tanks, and the like, on a corresponding support surface in a refrigeration unit or like apparatus, and particularly to a kit for mounting replacement electric motors, refrigerant tanks, and the like, in refrigeration air conditioning units and similar apparatuses.

2. Description of the Prior Art

A problem encountered with the maintenance of refrigeration appliances, specifically refrigeration air conditioning units, is that the replacement of electric motors, refrigerant tanks, and similar equipment in these units is generally limited to use of the original equipment manufacturer's replacement motors and other equipment only due to lack of standardization of mounting holes, and similar mounting structure, on such equipment in the industry.

Accordingly, there is need for an adaption system especially suited for adapting the mounting holes of one manufacturer's mounting standards to those of another manufacturer in order to permit maintenance personnel servicing any unit to use a standard replacement motor, refrigerant tank, and the like.

SUMMARY OF THE INVENTION

It is an object of the present invention to provide a kit for mounting electric motors, refrigerant tanks, and the like, which will permit a single article being mounted to be adapted to a unit constructed by any manufacturer.

It is another object of the present invention to provide a kit which permits the use of a maintenance system allowing maintenance personnel to service refrigeration air conditioning units, and the like, with a single line of replacement equipment.

It is yet another object of the present invention to provide a mounting bracket kit which will permit articles to be mounted in a desired manner without the need for especially constructed adapters, and the like.

These and other objects are achieved according to the present invention by providing a kit having: a clamp including a strap disposable for embracing an article to be mounted; and a pair of support brackets, each of the brackets having an upstanding leg portion and a depending base portion disposed substantially at a right angle to the leg portion and arranged abutting a support surface on which an article is to be mounted, with the brackets being provided with attachment devices for receiving the strap of the clamp and supporting the article to be mounted above the associated support surface.

The attachment devices advantageously include an elongated aperture provided in the leg portion of each bracket, with the aperture being arranged extending perpendicularly to the base portion of the bracket. Further, a slot is preferably provided extending perpendicular to the aperture, with the strap of the clamp being slidably disposed in one of the aperture and slot of each bracket in order to mount a particular article on its associated support surface regardless of the position of the original mounting holes provided in the support surface.

Referring to a particularly advantageous feature of the present invention, the leg portion of each of the brackets includes a lower section and a cooperating upper section, with elongated apertures being provided in each of the lower section and the upper section. Suitable fasteners permit mounting of the upper section on the lower section in an adjustable manner by engaging cooperating pairs of the apertures provided in the sections so as to connect the sections together in a predetermined relationship one to the other.

The attachment devices further include a bridge provided on the upper section of the leg portion of each bracket, with the bridge being arranged extending perpendicular to the aperture provided in the associated upper section. Accordingly, the strap of the clamp is slidably disposable selectively in the bridge as well as in one of the apertures or in the slot.

Preferably, each section of a leg portion of each bracket is provided with a plurality of apertures, together with a plurality of slots being provided in the lower section of the leg portion and a plurality of bridges being provided in the upper section of the same leg portion in order to increase the versatility of the adapting brackets.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a prespective view showing an adapting kit according to the present invention mount an electric motor.

FIG. 2 is a fragmentary, enlarged, side elevational view showing the brackets and motor of FIG. 1.

FIG. 3 is a fragmentary, enlarged, sectional view taken generally along the line 3—3 of FIG. 2.

FIG. 4 is a fragmentary, enlarged, sectional view taken generally along the line 4—4 of FIG. 2.

FIG. 5 is an exploded, perspective view showing a bracket employed with a mounting kit according to the present invention.

FIG. 6 is a perspective view, similar to FIG. 1, but showing adapting brackets according to the present invention mounting a refrigerant tank, and the like.

FIG. 7 is a perspective view, similar to FIG. 6, but showing another manner in which a refrigerant tank, and the like, may be mounted by adapting brackets according to the present invention.

FIG. 8 is an enlarged, sectional view taken generally along the line 8—8 of FIG. 7.

FIG. 9 is a side elevational view similar to FIG. 2, but showing a modified arrangement of the elements making up the invention.

DESCRIPTION OF THE PREFERRED EMBODIMENTS

Referring now more particularly to FIGS. 1 through 5 of the drawings, a conventional electric motor 10, such as employed with refrigeration air conditioning units, is illustrated as being supported on a support surface S by an adapter mounting assembly including a clamp 12 having a catch 14 for adjustably tightening and retaining a strap 16 in embraced relationship about an article such as electric motor 10 being mounted. A pair of support brackets 18 and 20, each of which brackets 18 and 20 has an upstanding leg portion 22, a depending base portion 24 disposed substantially at a right angle with respect to leg portion 22 and abutting support surface S, are provided with attachment devices for receiving strap 16 of clamp 12 and supporting the electric motor 10, or other piece of equipment, above support surface S.

The leg portion 22 of each of the brackets 18 and 20 includes a lower section 26 and an upper section 28. A plurality of elongated apertures 30, 30' are illustrated as being provided in each of the lower section 26 and upper section 28, with these apertures 30, 30' being arranged extending perpendicular to the associated base portion 24 of the bracket 18, 20. While a plurality of such apertures 30, 30' are illustrated, it will be understood that each section 26, 28 requires only a single aperture 30, 30' to carry out the invention. Conventional fasteners 32, such as the illustrated bolt and nut, are disposed in cooperating pairs of apertures 30, 30' for connecting upper section 28 to lower sections 26 in a predetermined relationship one to the other. In this manner, the heights of electric motor 10 above support surface S can be readily adjusted to that necessary for adapting an electric motor 10 to a particular unit in which electric motor 10 is being installed as a replacement for an original equipment motor.

In addition to one or more apertures 30, lower section 26 is further provided with one or more slots 34, while upper section 28 is provided with one or more loops or bridges 36. Thus, strap 16 of clamp 12 can be selectively slidably disposed in one of the apertures 30, slots 34, and bridges 36 in order to appropriately mounted an electric motor 10, and the like. As can be readily seen from the drawings, the bridges 36 are arranged extending perpendicularly to the apertures 30 and substantially parallel to the slots 34. While it is possible to carry out the invention by inserting strap 16 only into a single bridge 36, it is possible, and frequently desirable, to pass the strap 16 through a pair of such bridges 36 in the manner best seen in FIG. 3 in order to prevent rocking of the electric motor or other piece of equipment being mounted.

Base portion 24 is advantageously provided with one or more further apertures 38 disposed extending transversely to the elongated apertures 30 of the lower section 26 of each leg portion 22, and with one or more mounting holes 40 in order to permit adjustment or rigid mounting of the brackets 18, 20 as desired in a particular situation. In other words, the further apertures 38 and holes 40 provided in the feet or base portions 24 of the brackets 18, 20 are designed to accommodate a great variety of motor mounting requirements.

As can be readily understood from the above description and from FIGS. 1 through 5 of the drawings, arrangement of the various elements forming the invention as shown mounting electric motor 10 permits ready adjustment of the height of motor 10 above support surface S so as to accommodate a height of shaft 42 of motor 10, as measured from support surface S to shaft 42, the top of the upper section 28 of leg portion 22 when upper section 28 is fully extended on lower section 26, down to where motor 10 is supported on the support surface S (not shown). Further, motor 10 can be moved forward and backward within the strap 16 for adjustment in the axial direction of shaft 42, while proper selection of the length of strap 16 will permit clamp 12 to be adjusted to fit a motor of almost any diameter commonly encountered. This almost infinite adjustment of shaft height, axial position of the shaft, and diameter of motor housing provides almost unlimited flexibility in substituting motors for installation the previously required and used the original equipment manufacturer's replacement motor only.

In addition, the mounting system according to the present invention is not limited to motors or even to cylindrical objects. It can be used with octagons, rectangles, and other shapes that may be encountered. In fact, the system can be used with any article the band or strap 16 will conform to the peripheral configuration thereof.

When used to mount an electric motor 10, and the like, a very simple procedure is employed for assuring that the mounting of the replacement motor will correspond to the characteristics of the original motor. First, the height of the location of the shaft from the floor of the unit at the existing mounts is measured. Next, the lower section 26, including the base portion 24, of brackets 18, 20 are placed on the existing mounting studs, or other mounting fixtures, and are arranged facing in or out as required. If necessary, the further apertures 38 provided in the base portion 24 are matched with the existing studs and are bolted down firmly. The upper sections 28 are then held, with their bridges 36 topmost and facing in, inside the lower section 26. The required length up from the floor, or support surface S, is measured to determine which pair of the bridges 36 are to be used. Preferably, the upper pair of bridges 36 is to be used whenever possible to provide maximum overlap of upper section 28 with respect to lower section 26.

Using both upper sections 28, thread the strap 16, which may be constructed from stainless steel, and the like, through matching pair of the bridges 36 facing each other. The free end of strap 16 is now inserted into catch 14 and the upper sections 28 placed, with strap 16 in place, inside the lower sections 26 with sufficient overlap for connection of the sections 26, 28 to one another. Apertures 30 are selected at the approximate location which will cause shift 42 to match the desired shaft height consistent with that of the original motor. Thus, the shaft height will be at the midpoint of the selected pair of bridges 36 when strap 16 is tightened down by means of catch 14.

Insert fasteners 32, while adjusting upper section 28 up or down for proper height, and secure sections 26 and 28 to one another, making sure the bolts of fasteners 32 are clear of the motor 10. When more than one pair of apertures 30 are overlapping, install the nuts of the fasteners 32 so that they are not parallel in each leg portion 22 in order to provide maximum rigidity of the brackets 18 and 20. Now slide motor 10 into the strap 16 and tighten slightly. Motor 10 can be slid forward and backwad within strap 16 to give proper clearance for the blades of an associated fan (not shown) and the catch 14 tightened with a screw-driver, nut driven, and the like, as tight as possible.

It will be appreciated that the upper sections 28 of leg portions 22 may be used upside down (not shown) or reversed (not shown) for special applications.

Referring now to FIGS. 6 through 8 of the drawings, use of the mounting adapter system according to the invention with a refrigeration tank 44, and the like, will now be discussed. As can be seen by comparing FIGS. 6 and 7, slots 34 or apertures 30 can be employed to receive strap 16 in order to orient tank 44 in either a horizontal or vertical position. Basically, in addition, while the upper slot 34 and an upper pair of apertures 30 are shown in FIGS. 6 and 7, respectively, as receiving strap 16, it will be appreciated that the lower slots 34 and sets of apertures 30 may be employed to receive the strap 16 if less height is needed. Also, the base portions 24 of brackets 18, 20 can be turned inwardly to conserve space if necessary.

Under some circumstances, it is possible to use more than one set of brackets 18, 20 to secure large objects, such as a refrigerant receiver for an air conditioning system. Further, it is possible to use additional straps 16 if required, depending upon the specific object or article being supported.

FIG. 9 shows an arrangement wherein the upper sections 28 are rotated 90 degrees from the position shown in FIG. 2 so that a shaft 42' of a motor 10' is disposed substantially vertically. Suitble fasteners engage in cooperating apertures 30 or 34 and 30' to secure sections 28 to sections 26. While FIG. 9 has sections 28 mounted symmetrically with respect to sections 26, it is to be understood that an offset relationship can be used if necessary by shifting sections 28 transversely of sections 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A kit for mounting electric motors, refrigerant tanks, and the like, on a support surface, having mounting holes differing from the mounting dimensions of the article to be mounted, the kit comprising, in combination:
    a. clamp means including a strap for embracing an article to be mounted; and
    b. a pair of support brackets, each of the brackets having an upstanding leg portion and a base portion disposed substantially at a right angle to the leg portion and abutting a support surface, with the brackets being provided with attachment means for receiving the strap of the clamp means and supporting the article to be mounted above the support surface, the attachment means including an elongated aperture provided in the leg portion of each bracket, the aperture arranged extending perpendicular to the base portion of the bracket, and a slot arranged extending perpendicular to the aperture, with the strap of the clamp means being slidably disposed in one of the aperture and slot of each bracket.

2. A structure as defined in claim 1 wherein the leg portion of each of the brackets includes a lower section and an upper section, with an elongated aperture being provided in each of the lower section and upper section and being arranged extending perpendicular to the associated base portion of each respective bracket, and fastener means mounted in cooperating pairs of the apertures for connecting the upper section to the lower section in a predetermined relation between the sections.

3. A structure as defined in claim 2, wherein the upper section and lower section each includes a plurality of elongated apertures, with the base portion being provided with a plurality of further elongated apertures extending transversely to elongated apertures of the leg portion in order to provide adjustment of each bracket transverse to the upward extent of the leg portion of the bracket.

4. A structure as defined in claim 3, wherein the attachment means further includes a plurality of bridges provided on the upper section of the leg portion of each bracket and arranged extending perpendicularly to the aperture provided in the upper section, with the strap being slidably disposed in one of the aperture, slot, and bridges.

5. A structure as defined in claim 3, wherein the attachment means further includes a bridge provided on the upper section of the leg portion and arranged extending perpendicularly to the aperture of the upper section, with the strap being slidably disposed in one of the aperture, slot, and bridge.

6. A structure as defined in claim 5, wherein the attachment means includes a plurality of bridges provided on the upper section of the leg portion of each bracket.

7. A kit for mounting electric motors, refrigerant tanks, and the like, on a support surface, the kit comprising, in combination:
    a. clamp means including a strap for embracing an article to be mounted:
    b. a pair of support brackets, each of the brackets including a leg portion comprising a lower section and an upper section removable from the lower section:
    c. fastener means for selectively attaching the upper section to the lower section; and
    d. attachment means provided in the lower section and upper section for selectively receiving the strap of the clamp means, the strap being arrangeable in the lower section and the upper section as height requirements dictate, the attachment means including an elongated aperture provided in the leg portion of each bracket, the aperture arranged extending perpendicular to the base portion of the bracket, and a slot arranged extending perpendicular to the aperture, with the strap of the clamp means being slidably disposed in one of the aperture and slot of each bracket.

8. A structure as defined in claim 7, wherein the attachment means further includes a bridge provided on the upper section of the leg portion and arranged extending perpendicularly to the aperture of the upper section, with the strap being slidably disposed in one of the aperture, slot, and bridge.

9. A structure as defined in claim 8, wherein the upper section and lower section each includes a plurality of elongated apertures, with the base portion being provided with a plurality of further elongated apertures extending transversely of the elongated apertures of the leg portion, and wherein the attachment means further includes a plurality of bridges provided in the upper section of the leg portion of each of the brackets.

* * * * *